Dec. 18, 1928.　　　　　G. B. COLLINS　　　　　1,695,367
METAL TESTING APPARATUS
Filed Oct. 5, 1923　　　3 Sheets-Sheet 1
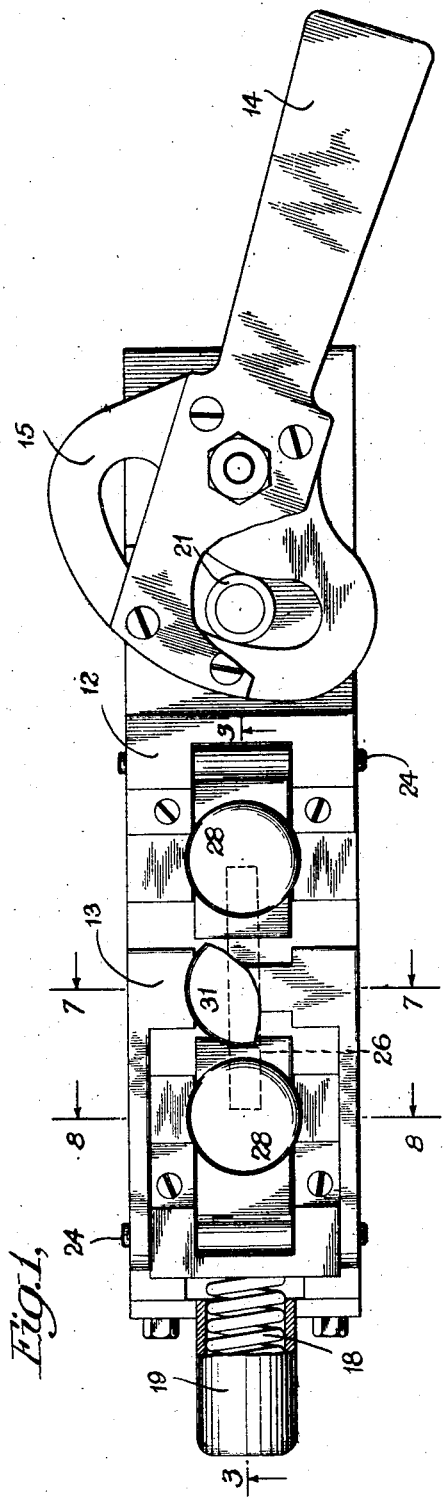
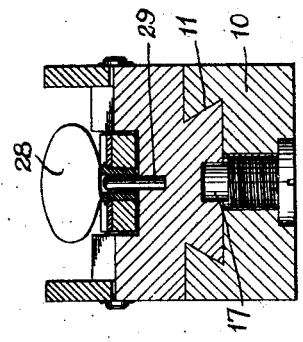
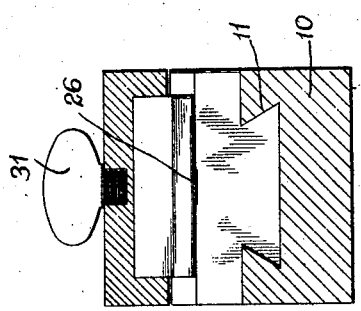
Inventor
George B. Collins
By his Attorney Dec. 18, 1928.   G. B. COLLINS   1,695,367
METAL TESTING APPARATUS
Filed Oct. 5, 1923   3 Sheets-Sheet 2
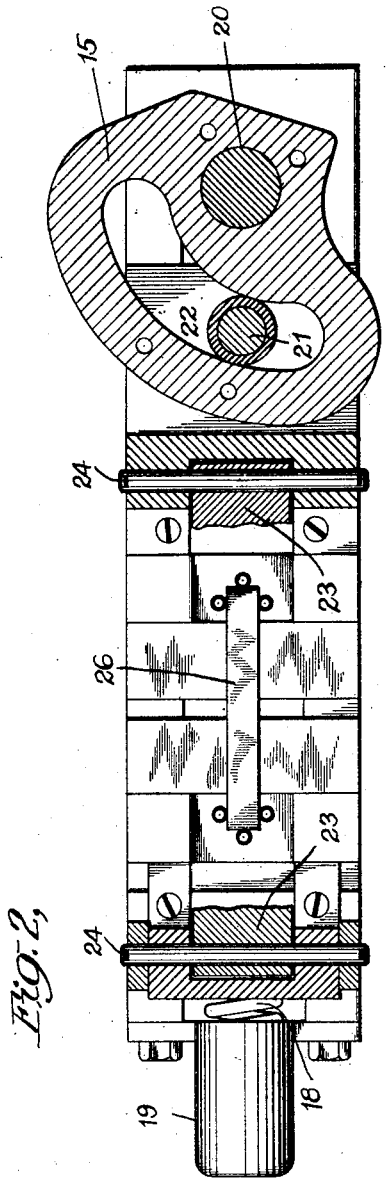
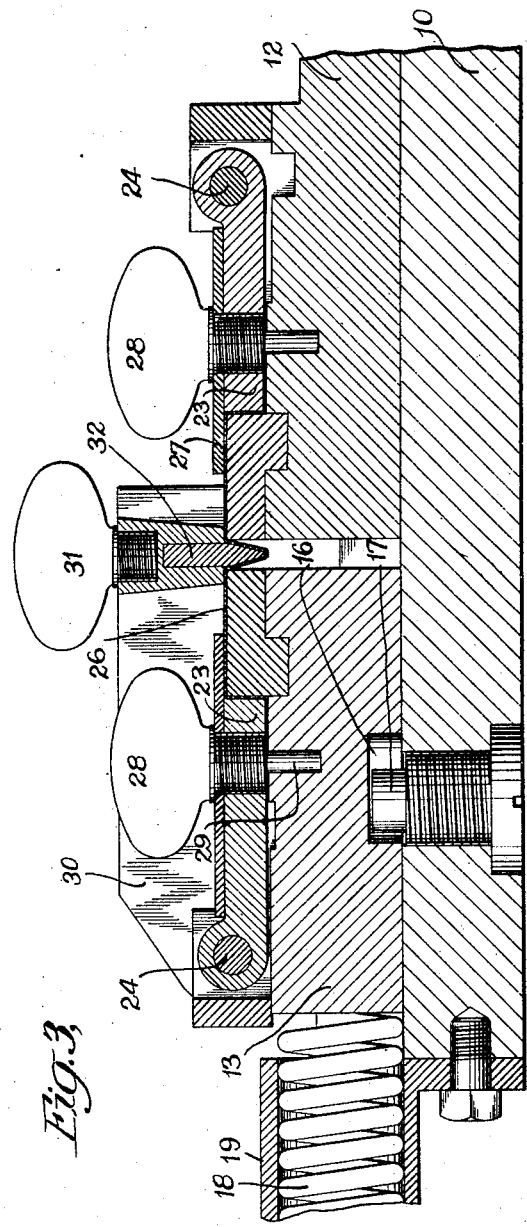
Inventor
George B. Collins
By his Attorney

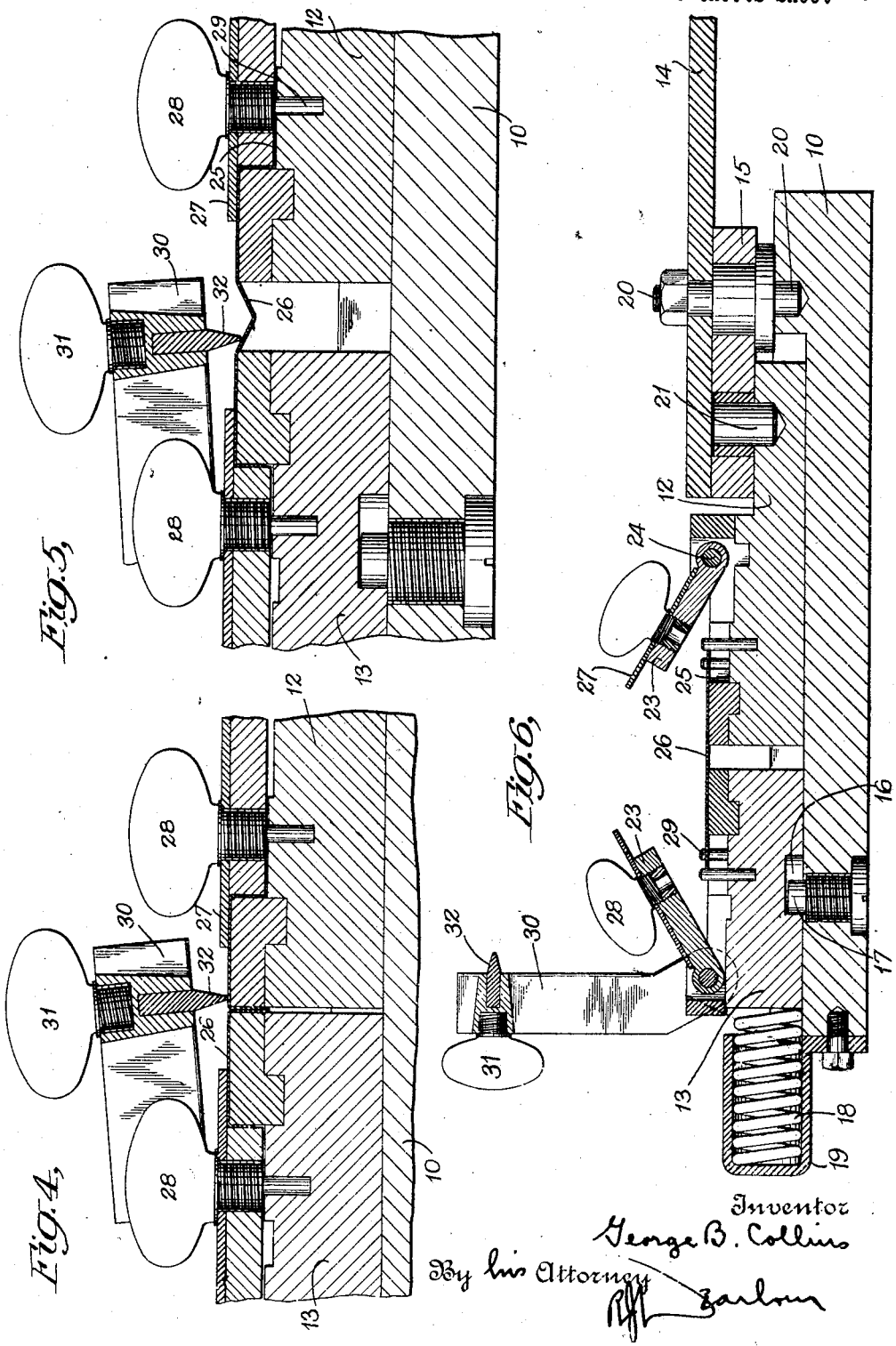

Patented Dec. 18, 1928.

1,695,367

UNITED STATES PATENT OFFICE.

GEORGE B. COLLINS, OF PORT ARTHUR, TEXAS, ASSIGNOR, BY MESNE ASSIGNMENTS, TO THE TEXAS COMPANY, OF NEW YORK, N. Y., A CORPORATION OF DELAWARE.

METAL-TESTING APPARATUS.

Application filed October 5, 1923. Serial No. 666,669.

This invention relates particularly to means for testing sheet metal, such as tin, copper, brass or the like, or in fact any sheet metal.

The invention has for one of its principal objects the provision of means whereby different pieces of metal may be tested under identical conditions so that an accurate comparison between the different pieces can be easily and accurately made.

An important object of the invention is to provide means whereby the metal under test is subjected to the same stress during each successive cycle of operation and whereby each piece of metal tested in the device is subjected to the same stresses.

Still further objects are to provide means for securing the metal strip to be tested in the machine, for producing the proper motion of the movable members, and for applying the initial bend in the strip under test.

In the furtherance of the above and other objects the invention contemplates the provision of means whereby the metal to be tested may be subjected to a series of stresses of uniform degree of intensity and embraces broadly and generally mechanism comprising opposed jaws to which the metal to be tested may be secured; means for imparting a predetermined oscillating or reciprocating motion to the jaws so that the metal may be alternately bent and unbent and resilient means tending to oppose the movement of the jaws.

In order that my invention may be clearly understood, I will now proceed to describe the same in the following specification and point out the novel features thereof in the appended claims.

Referring to the drawings:

Figure 1 is a plan view of a machine constructed in accordance with my invention, portions thereof having been cut away to more clearly show its construction.

Figure 2 is another plan view with additional portions cut away.

Figure 3 is a central vertical section taken on the line 3—3 of Figure 1.

Figures 4 and 5 are central vertical sections taken on the line 3—3 of Figure 1 showing portions of the apparatus and different positions of the movable members.

Figure 6 is a central vertical section of the whole machine.

Figures 7 and 8 are sections taken on the lines 7—7 and 8—8, respectively, of Figure 1.

The apparatus thus illustrated includes a base 10 having a dove-tailed groove 11 in which jaw members 12 and 13 are slidably mounted. Means are provided for imparting an oscillatory or reciprocatory movement to one or both of the slidable members. Thus, as illustrated, a lever 14 is pivotally mounted on a stud or pin 20 which is secured to the base 10. The lever is provided with a cam 15 having a camway 22 within which projects a stud 21 secured to the movable member 12. It is apparent that, by reason of the stud 21 which is engaged in the camway 22, when the lever 14 is oscillated the member 12 is moved back and forth a predetermined distance within the groove 11.

The other slidable member 13 is also adapted to travel within the groove 11 but is preferably arranged to be moved within narrow limits, as compared to the movement of the member 12. Thus the member 13 is provided on its bottom with a slot 16 into which a stop 17, projecting upwardly from the base 10, extends. It is apparent that the movement of the member 13 in either direction is limited by the stop 17. A spring or resilient member 18 suitably positioned within a housing 19 is adapted to bear against the slidable member 13 tending to push it towards the other movable member 12 and against the stop 17. The resilient member 18 should be carefully constructed and tested to deflect a given amount under a predetermined pressure. In the operation of the device the metal to be tested is bent when the member 12 is pushed against the member 13, as will be hereinafter more fully explained, and the resilient member 18 serves to oppose the movement imparted to member 13 by member 12 and thus operates to limit the amount of pressure that can be exerted on the bent metal. The camway is so adjusted in relation to the other elements of the device that in the movement imparted to the member 13 by the member 12 the member 13 is never moved against the resiliency of the member 18 to such an extent that it comes in contact with the stop 17.

Each of the slidable members 12 and 13 is provided with a clamp 23 pivotally mounted on a pin 24, and each of the slidable members is also provided with a recess 25 wherein the clamp 23 may be positioned for holding a strip of tin 26, or other metal to be tested, each clamp 23 being composed of a portion which is adapted to thus enter the recess 25 and an extending portion 27 which is adapted to rest upon the top of the slidable member. Each clamp is provided with a handle 28. Each slidable member is provided with pins 29 by which the piece of tin 26 to be tested can be centered properly in the machine. Obviously, each sample of tin is cut of a given length and width so that it just fits within the pins. It is understood, of course, that the sample or strip to be tested is cut or otherwise taken from the larger piece and is reduced to the size adopted as standard for the particular machine. Another clamp member 30 is pivotally mounted, as on one of the pins 24 on either of the slidable members 12 or 13. In the present instance, however, the clamp member 30 is shown mounted on the movable member 13. The clamp 30 is provided with a handle 31 and with a keen edged member or knife 32 of substantially V shaped cross section.

When it is desired to test a piece of metal the sample is placed on top of the slidable members 12 and 13, which are spaced slightly apart, and properly centered between the pins 29. The keen edged member 32 is then pressed downwardly into the space between the two slidable members 12 and 13 so that the tin is bent downwardly in substantially a V formation as shown in Figure 5. The clamp members 23 are then pressed into the recess 25 so as to firmly clamp the ends of the metal strip 26 in position. In common practice a mallet is used to hammer the clamps 23 into position. When the metal has been properly dented and firmly secured the handle 14 is moved backward and forward thereby causing the slidable member 12 to move back and forth by reason of the cam action already described. By this movement the metal 26 under the knife 32 is alternately bent and straightened. The movement is continued until the metal breaks. The numerical expression of the test is given by the number of movements of the handle 14.

It will be observed that in the bending of the metal under test the pushing of the member 12 against the member 13 places the spring 18 under a predetermined tension which insures that a given pressure will be exerted on the bent metal. Thus regardless of differences in the speed or character of the movement imparted to the lever 14 the same degree of stress is given to the metal each time it is bent. By thus combining the cam controlled movement with the resilient means for opposing the movement during the bending of the metal the oscillations of the handle 14 are thus caused to subject the metal to the same stress with each stroke so that uniform results are obtained.

Apparatus of preferred form and construction has been illustrated and described for the purpose of showing a way in which this invention may be constructed, but the inventive thought upon which this application is based is broader than this illustrative embodiment thereof. It is, therefore, understood that the scope of the invention is not to be limited by the present disclosure, reference being had to the appended claims for that purpose.

What I claim is:

1. Apparatus for testing sheet metals comprising a base, a plurality of members slidably mounted on the base, means for securing the metal to be tested to the slidable members, means comprising a keen edged member pivotally mounted on one of said slidable members for applying an initial bend in the strip under test, and means operatively connected to the other slidable member whereby the strip is alternately bent and straightened until broken.

2. Apparatus for testing strip metal comprising a base, a pair of oppositely disposed jaw members slidably mounted on the base, means for securing an end of the metal strip to be tested to each of the slidable jaw members, resilient means cooperating with one of the slidable jaw members, and means producing a cam action cooperating with the other slidable jaw member for moving the member backward and forward a predetermined distance on the base.

3. Apparatus for testing strip metal, comprising a base having a dovetailed groove extending longitudinally thereof, a pair of oppositely disposed members slidably mounted in said groove, means for positively limiting the longitudinal movement of one of said members, resilient means exerting a constant longitudinal force against that member, means operatively connected to the base and to the other slidable member for moving the latter back and forth a predetermined distance on the base, and means pivotally mounted on each of the slidable members for securing thereto an end of the strip to be tested.

4. Apparatus for testing strip metals comprising a base, a pair of opposed jaw members slidably mounted on said base, spaced projections on each of said jaw members for initially centering the metal strip under test thereon, means for subsequently clamping the ends of said strip to the jaw members, and means for oscillating one of the jaw members to subject the strip of metal to predetermined stresses.

5. Apparatus for testing strip metals comprising a base, a pair of jaw members slidably mounted on the base and adapted for holding the ends of the strip under test, a projection on the upper face of one of the jaw members, a cam pivotally mounted on the base and formed with an arcuate slot adapted to receive the projection on the face of the movable member, and means for oscillating the cam to provide a reciprocating movement of the jaw member with which it is connected.

6. Apparatus for testing strip metal comprising a base, slidable members mounted on the base, means for securing an end of the metal to be tested to each of the slidable members, means on one of the slidable members for applying an initial bend in the strip under test, and means operatively connected to one of the slidable members for moving it backward and forward whereby the strip is alternately bent and straightened until broken.

7. Apparatus for testing strip metal comprising a base having a groove extending longitudinally thereof, oppositely disposed jaw members slidably mounted in said groove, means for securing an end of the metal strip to be tested to each of the slidable jaw members, and an eccentric cooperating with one of the slidable jaw members for effecting a limited and regular reciprocating movement of said member.

In witness whereof, I have hereunto set my hand this 28 day of Sept., 1923.

GEO. B. COLLINS.